United States Patent
Haygood et al.

(10) Patent No.: US 6,989,186 B2
(45) Date of Patent: *Jan. 24, 2006

(54) UPHOLSTERY FABRIC TACK STRIPS

(76) Inventors: David L. Haygood, 1260 County Road 175, Florence, AL (US) 35634; Gary T. Schwertner, 300 Rock Crusher Rd., St. Joseph, TN (US) 38481

( * ) Notice: Subject to any disclaimer, the term of this patent is extended or adjusted under 35 U.S.C. 154(b) by 14 days.

This patent is subject to a terminal disclaimer.

(21) Appl. No.: 10/428,834

(22) Filed: May 5, 2003

(65) Prior Publication Data

US 2004/0001936 A1 Jan. 1, 2004

Related U.S. Application Data

(63) Continuation-in-part of application No. 10/180,102, filed on Jun. 27, 2002, now Pat. No. 6,647,610.

(51) Int. Cl.
*B32B 3/06* (2006.01)

(52) U.S. Cl. .................... 428/99; 428/100; 428/132; 428/133; 411/442; 411/443; 411/457; 411/466; 411/477

(58) Field of Classification Search .................. 428/99, 428/100, 132, 133, 134; 411/466, 477, 457, 411/442, 443, 551
See application file for complete search history.

(56) References Cited

U.S. PATENT DOCUMENTS

| | | | | | |
|---|---|---|---|---|---|
| 3,670,071 | A | * | 6/1972 | Walchle et al. | 264/273 |
| 4,490,074 | A | * | 12/1984 | Chaiko | 405/259.1 |
| H0078 | H | * | 6/1990 | Schneider, Jr. | 216/35 |
| 5,613,817 | A | * | 3/1997 | Bush et al. | 411/466 |
| 6,537,646 | B2 | * | 3/2003 | Haygood et al. | 428/132 |

* cited by examiner

Primary Examiner—Patrick Joseph Ryan
Assistant Examiner—Jane Rhee
(74) Attorney, Agent, or Firm—Nixon & Vanderhye P.C.

(57) ABSTRACT

An upholstery tack strip includes a metal ribbon and a thermoplastic sleeve covering at least a portion of the ribbon. The sleeve includes at least one, and possibly a pair of, lengthwise removed strip section(s) so as to expose a corresponding lengthwise surface of the metal ribbon. The metal ribbon integrally includes nail sections which protrude outwardly from said tack strip. At least one, and preferably both, lateral edges of the metal ribbon are knurled or serrated so as to assist in anchoring the ribbon to the sleeve.

10 Claims, 3 Drawing Sheets

UPHOLSTERY FABRIC TACK STRIPS

CROSS-REFERENCE TO RELATED APPLICATION

This application is a continuation-in-part of U.S. patent application Ser. No. 10/180,102 filed on Jun. 27, 2002 now U.S. Pat. No. 6,647,610, the entire content of which is expressly incorporated hereinto by reference.

FIELD OF THE INVENTION

The present invention relates generally to the field of upholstery fabric tack strips and methods of making the same, especially tack strips that are used to attach upholstery fabric to an underlying furniture frame member.

BACKGROUND AND SUMMARY OF THE INVENTION

Conventional upholstery tack strips are made from flat metal (e.g., metal) ribbons by a punch-press operation. Specifically, generally triangularly-shaped nails are formed by punching out correspondingly shaped, partially cut-out sections from the metal ribbon at spaced-apart locations along the ribbon's length and then bending the sections so each is at substantially a right angle relative to the ribbon stock. Thus, the nails remain unitarily attached to the metal ribbon, but project outwardly therefrom.

In use, the metal from which conventional tack strips are made can physically mar and/or abrade the upholstery fabric. For example, the ribbon, if formed from metal, may rust over time which might in turn visibly discolor the fabric. Furthermore, the edges of the metal tack strip may abrade or cut the upholstery fabric. In order to prevent such problems, it has been conventional practice to provide upholstery tack strips with a separate C-shaped plastic sleeve which slides over the tack strip along its length. The plastic sleeve, however, is itself problematic in that it involves a separate manufacturing step to slideably mate it with the tack strip. Furthermore, unless some means are provided to restrict relative lengthwise movement between the metal tack strip and the sleeve, the latter can become separated from the former during use and/or installation.

In our recently issued U.S. Pat. No. 6,537,646 B2 (the entire content of which is expressly incorporated hereinto by reference), novel upholstery tack strips are provided which include a thermoplastic sleeve and a metal ribbon embedded within the sleeve. The sleeve itself includes a plurality of removed material sections forming opposed pairs of sleeve windows, while the metal ribbon integrally includes nail sections which protrude outwardly from the tack strip through respective ones of the sleeve windows. Most preferably, the sleeve is extrusion-coated onto the metal ribbon stock using a cross-head die with a screw extruder. The thus-coated metal strip preform may then be transferred to downstream fabrication operations whereby the sleeve windows and nail portions are formed. Since the nail portions protrude outwardly from the tack strip through the sleeve windows, relative lengthwise slippage between the metal ribbon stock and the sleeve is prevented.

The present invention is directed specifically toward improvements to the upholstery tack strips of the type generally disclosed in our above-cited U.S. Pat. No. 6,537,646 B2. More specifically, according to the present invention upholstery tack strips include a metal ribbon and a thermoplastic sleeve covering at least a portion of the ribbon. The sleeve includes at least one lengthwise removed strip section so as to expose a corresponding lengthwise surface of the metal ribbon. Most preferably, at least one (and advantageously both) edges of the metal ribbon are knurled or serrated so as to present a roughened surface to the sleeve and thereby anchor the metal ribbon to the sleeve and thereby assist in maintaining the relative positioning of the sleeve and metal ribbon. An adhesive may optionally alternatively or additionally be applied to the metal ribbon so as to also assist in anchoring the thermoplastic sleeve thereto. The metal ribbon integrally includes nail sections which protrude outwardly from said tack strip.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
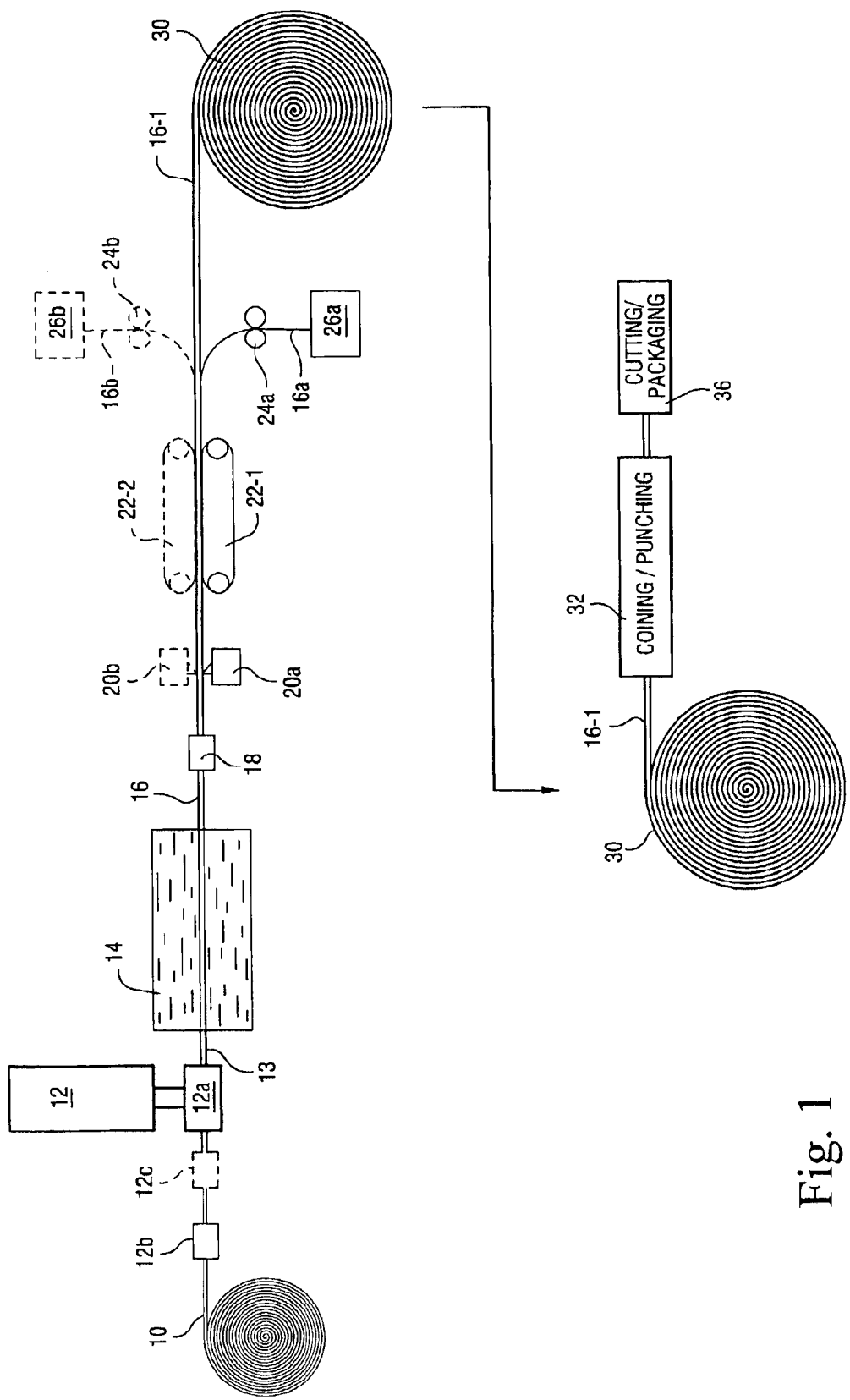
FIG. 1 is a schematic view showing a possible manufacturing sequence in accordance with the present invention.

Accompanying FIG. 1 depicts one possible manufacturing sequence for making the upholstery tack strip of the present invention. In this regard, a roll of metal strip or ribbon stock 10 may be fed to and through the cross-head die 12a associated with screw extruder 12. Prior to being fed through the cross-head die 12a, however, the ribbon 10 is preferably pulled through a knurling tool 12b which may include, for example, a pair of opposed knurled rollers acting on at least one, and preferably both, of the lateral edges of the metal ribbon 10 so as to knurl the same as shown by reference numeral 10a in FIGS. 2–3 below. In this manner, the knurled edges 10a present a roughened surface to the thermoplastic sleeve applied via the cross-head die 12a so as to assist in anchoring the ribbon 10 thereto. The ribbon 10 may optionally alternatively or additionally be pulled through an adhesive applicator 12c which serves to apply an adhesive material onto the ribbon 10 and thereby assist in anchoring the thermoplastic sleeve thereto which will be applied via the cross-head die 12a.

As is well known, thermoplastic pellets may be fed into the hopper (not shown) of the screw extruder 12. The extruder 12 thus forms a molten stream of the thermoplastic material which is fed into the cross-head die 12a and applies a coating over the entire surfaces of metal ribbon 10. The coated ribbon (now designated by numeral 13 in FIG. 1) then enters a water quench bath 14. Upon cooling, therefore, the thermoplastic material is thereby coated onto the metal ribbon stock 12 so as to form a composite strip preform 16. Specifically, the preform 16 includes a core of the metal ribbon stock 10 which is embedded within, and thus coated entirely by, a sleeve formed of solidified thermoplastic material (i.e., the solidified residue of the thermoplastic material applied in its molten state by the cross-head die 12a).

Virtually any thermoplastic material may be employed in accordance with the present invention. Preferred thermoplastic materials include polyolefins (e.g., polyethylene and polypropylene), nylons, polyesters, polyvinyl chlorides and the like.

The composite strip preform 16 passes through an air dryer 18 which serves to remove water from the surface of the perform 16 prior to being directed to a cutter 20*a*. The perform is pulled from the roll of stock through the cross-head die 12*a*, quench bath 14 air dryer 18 and cutter 20*a* via an opposed set of pull rolls 22-1, 22-2. The cutter 20*a* serves to cut a substantially centrally located longitudinally oriented strip section 16*a* of the thermoplastic coating, which strip 16*a* is then removed from the upper and lower surfaces, respectively, of the metal stock 10 via roller pairs 24*a*. The removed thermoplastic strip 16*a* is then collected in waste bin 26*a* for recycling to the extruder 12 where it can be re-melted and combined with virgin thermoplastic material so as to coat the stock 10 in the cross-head die as was explained previously.

Figure 2:
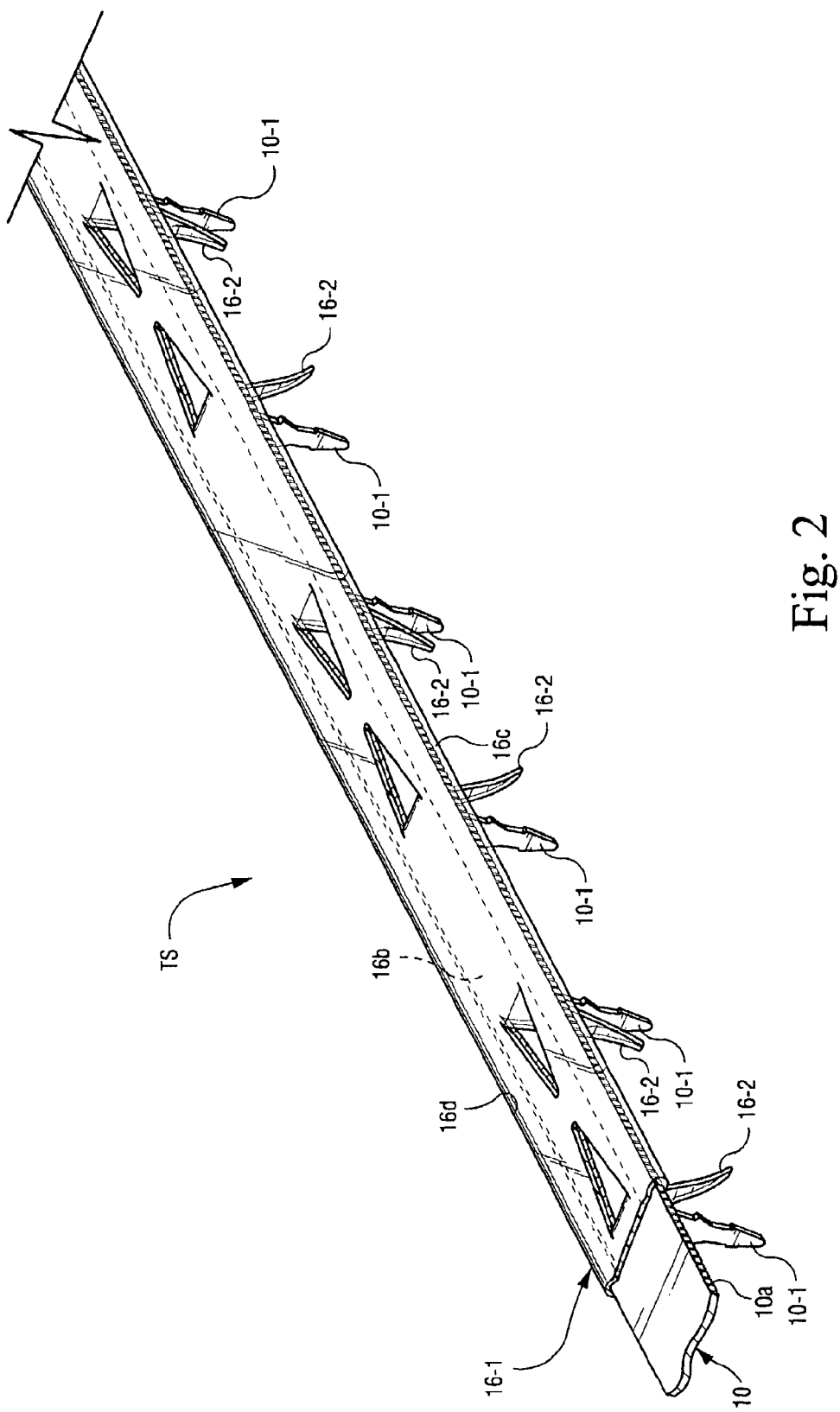
FIG. 2 is a top perspective view showing a representative length of an upholstery tack strip in accordance with the present invention.
Figure 3:
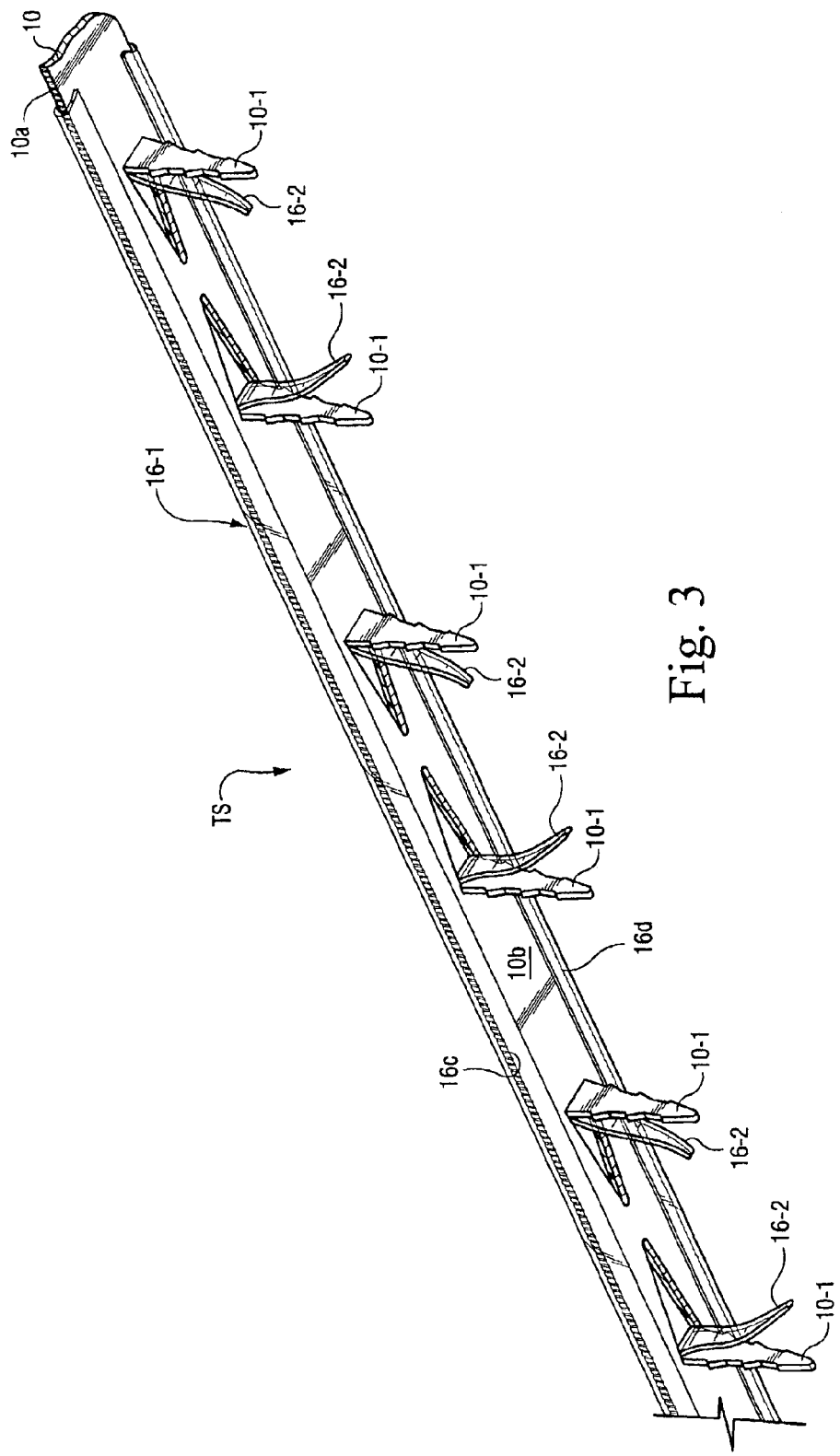
FIG. 3 is a bottom perspective view showing a representative length of an upholstery tack strip in accordance with the present invention.

Optionally, a cutter 20*b*, rollers 24*b* and waste bin 26*b* may be provided so as to remove a strip 16*b* from the opposite surface of the composite strip 16. If such a strip 16*b* is removed, then a pair of longitudinally extending exposed surface regions of the metal ribbon 10 will result. That is, with removal of both strips 16*a*, 16*b*, only the side edge regions of the stock 10 will be covered with the thermoplastic material forming generally U-shaped edge protectors. Most preferably, however, as shown in FIGS. 2 and 3, only the bottom strip 16*a* is removed thereby exposing a lengthwise extending section 10*b* of the lower surface of the metal strip 10 (see FIG. 3).

The edge-coated perform (now designated by reference numeral 16-1 in FIG. 1) may subsequently be formed into a roll 30 and then used as a feed for a coining/punching operation 32 as shown in FIG. 1. Alternatively, the composite strip preform 16 may be fed continuously from the cross-head die 12*a*, through the cutter 20*a* and then to the coining/punching operation 32.

During the coining/punching operation 32, nail-forming punch dies are brought to bear directly against the upper and lower surfaces metal strip 10. Thus, as with conventional tack strips, therefore, the coining/punching operation 32 serves to punch out generally triangularly shaped nails 10-1 from the metal ribbon 10 and bend them at substantially right angles thereto as shown in accompanying FIGS. 2 and 3. The finished tack strip TS in accordance with the present invention may then be cut into desired lengths (e.g., from about 3 inches in length up to about 48 inches in length), packaged and shipped in operation 36 as shown in FIG. 1.

As can be appreciated, removal of the strip 16*a* will form a pair of opposed edge protectors 16*c*, 16*d* as an integral extruded member which covers the lateral edges of the metal ribbon stock 10. That is, the removal of the strip 16*a* to expose the lower surface of ribbon 10 will provide the generally U-shaped edge protectors 16*c*, 16*d* which are joined integrally one to another along the upper surface of the ribbon 10. As such, the sleeve and the edge protectors 16*c*, 16*d* do not need to be installed during a separate operation. As noted previously, the knurled edges 10*a* of the ribbon 10 present a roughed surface to the edge protectors 16*c*, 16*d* thereby anchoring the ribbon 10 thereto. However, if desired, an adhesive may be alternatively or additionally be applied to the edges 10*a* of the ribbon stock 10 prior to being drawn through the cross-head die 12*a* so that the resulting edge protectors 16*c*, 16*d*, remain physically in place during handling. Also, in the embodiment depicted in FIGS. 2 and 3 wherein only strip 16*a* is removed, there will also exist generally triangular sleeve remnants 16-2 integrally attached at their bases to the sleeve. Such remnants 16-2 will thus extend downwardly through the hole remaining in the ribbon 10 by virtue of the nails 10-1 being formed in the coining/punching operation 32.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An upholstery tack strip comprising a metal ribbon and a thermoplastic sleeve covering at least a portion of said ribbon, wherein said sleeve includes a lengthwise removed section so as to expose a corresponding lengthwise surface of the metal ribbon, and wherein said metal ribbon integrally includes nail sections which protrude outwardly from said tack strip, and wherein said ribbon includes at least one knurled lateral edge having a series of transverse ridges along a lengthwise extent of the at least one lateral edge, wherein said ridges establish a roughened surface to assist in positionally anchoring said thermoplastic sleeve to said metal ribbon.

2. The upholstery tack strip as in claim 1, wherein said ribbon includes a series of transverse ridges disposed along a lengthwise extent of each respective lateral edge thereof.

3. The upholstery tack strip as in claim 1, wherein said nail sections protrude outwardly through said removed section of said sleeve.

4. The upholstery tack strip as in claim 3, wherein said nail sections are generally triangularly shaped.

5. The upholstery tack strip as in claim 1, wherein said sleeve is formed of a thermoplastic material.

6. The upholstery tack strip as in claim 5, wherein the thermoplastic material is selected from the group consisting of polyolefins, nylons, polyesters, and polyvinyl chlorides.

7. The upholstery tack strip as in claim 1, further comprising an adhesive for adhering said sleeve to said metal ribbon.

8. The upholstery tack strip as in claim 1, wherein said sleeve includes a pair of lengthwise removed sections so as to expose opposed lengthwise surface regions of said metal ribbon and to establish generally cross-sectionally U-shaped edge protectors covering lateral edges of said metal ribbon.

9. An upholstery tack strip comprising a metal ribbon having opposed lateral knurled edges each having a series of transverse ridges extending along a lengthwise extent thereof, and a pair of thermoplastic generally cross-sectionally U-shaped edge protectors covering said knurled edges of said metal ribbon, wherein said metal ribbon integrally includes nail sections which protrude outwardly from said tack strip.

10. The upholstery tack strip as in claim 9, wherein said edge protectors are integrally joined to one another along an upper surface of said ribbon, and wherein an elongate channel is defined by said edge protectors along a lower surface of said ribbon, said nail sections protruding outwardly from said ribbon within said defined channel.

* * * * *